(12) United States Patent
Lin

(10) Patent No.: US 8,368,816 B2
(45) Date of Patent: Feb. 5, 2013

(54) CIRCUIT AND METHOD FOR DETECTING MOTION PICTURES

(75) Inventor: Teng-Yi Lin, Kaohsiung County (TW)

(73) Assignee: Novatek Microelectronics Corp., Hsinchu (TW)

( * ) Notice: Subject to any disclaimer, the term of this patent is extended or adjusted under 35 U.S.C. 154(b) by 722 days.

(21) Appl. No.: 12/510,266

(22) Filed: Jul. 28, 2009

(65) Prior Publication Data

US 2010/0283896 A1      Nov. 11, 2010

(30) Foreign Application Priority Data

May 7, 2009   (TW) ............................... 98115171 A

(51) Int. Cl.
*H04N 7/12*   (2006.01)
(52) U.S. Cl. ........ 348/700; 348/701; 348/708; 348/709; 348/710; 348/711; 348/712; 348/713; 348/720; 375/240.01
(58) Field of Classification Search .................. 348/700, 348/701, 708–713, 720; 375/240.01
See application file for complete search history.

(56) References Cited

U.S. PATENT DOCUMENTS

2002/0080284 A1    6/2002   Kim et al.

FOREIGN PATENT DOCUMENTS

TW          200743058         11/2007

OTHER PUBLICATIONS

"First Office Action of China Counterpart Application", issued on Aug. 25, 2011, p. 1-p. 8.
"Office Action of Taiwan Counterpart Application", issued on Aug. 29, 2012, p1-p6, in which the listed reference was cited.

*Primary Examiner* — Sath V Perungavoor
*Assistant Examiner* — Geepy Pe
(74) *Attorney, Agent, or Firm* — Jianq Chyun IP Office

(57) ABSTRACT

A circuit for detecting motion pictures includes a first-stage motion picture detecting unit and a second-stage motion picture detecting unit. The first-stage motion picture detecting unit analyzes a current image frame and a previous image frame to calculate a first motion value associated with the current image frame. The second-stage motion picture detecting unit receives the first motion value, compares the first motion value against an adjusted motion value, and outputs and stores a larger one as a second motion value. The adjusted motion value is a value derived by adjusting an adjacent previous second motion value.

13 Claims, 4 Drawing Sheets

CIRCUIT AND METHOD FOR DETECTING MOTION PICTURES

CROSS-REFERENCE TO RELATED APPLICATION

This application claims the priority benefit of Taiwan application serial no. 98115171, filed on May 7, 2009. The entirety of the above-mentioned patent application is hereby incorporated by reference herein and made a part of specification.

BACKGROUND OF THE INVENTION

1. Field of the Invention

The present invention relates generally to a dynamic image displaying technology, and more particularly, to a motion picture detecting technology.

2. Description of Related Art

For image displaying, the content of each image frame changes if there is a motion object in the image. However, in some cases, the image being displayed is a static picture. Since static pictures and dynamic images are displayed in different manners, a degree of motion of the pictures is usually detected to provide a motion value which is used as reference for subsequent procedure in the displaying system. The motion value is within a predetermined range and corresponds to the degree of the motion. In general, a greater motion value indicates a greater change in the image content.

In a traditional way of detecting the motion pictures, the motion value is obtained by performing subtraction between data of two adjacent image frames. FIG. 1 illustrates a conventional circuit for detecting motion pictures. Referring to FIG. 1, the conventional motion picture detecting circuit includes an image frame buffer 100 and a motion detecting unit 102. Data of the image frame Fn is continuously inputted to the image frame buffer 100. The image frame buffer 100 may buffer data of two continuous image frames Fn and Fn−1. In addition, a current image frame Fn is also inputted to the motion detecting unit 102. The motion detecting unit 102 performs a subtraction between the data of the two image frames $F_n$ and $F_{n-1}$ to obtain a motion value which is outputted through a path 104.

The motion value obtained through the path 104 according to the mechanism of FIG. 1 is related to the degree of change in the image frame data, which shows the image displaying is dynamic. FIG. 2 illustrates an implementation result of the circuit of FIG. 1. Referring to FIG. 2, three continuous image frames $F_n$-$F_{n+2}$ are taken as an example, where image data in the same locations 120', 122' 124' of the image frames $F_n$-$F_{n+2}$ are compared. The image data of the locations 120', 122' 124' may be compared on a pixel-by-pixel basis. Alternatively, the comparison may be conducted by comparing average image data of respective locations 120', 122', 124'. Greater image motion leads to greater change in the images of the same locations 120', 122', and 124'.

However, the method of FIG. 1 may easily cause miscalculation. For example, an incorrect motion value may be obtained when only a local image is in motion, in which case subsequent image displaying may be processed in an improper way according to the incorrect motion.

SUMMARY OF THE INVENTION

Accordingly, the present invention is directed to a technology for detecting motion pictures which can more accurately detect a motion object.

In one aspect, the present invention provides a circuit for detecting motion pictures. The circuit comprises a first-stage motion picture detecting unit and a second-state motion picture detecting unit. The first-state motion picture detecting unit analyzes a current image frame and a previous image frame and calculates a first motion value associated with the current image frame. The second-state motion picture detecting unit receives the first motion value, compares the current first motion value against an adjusted motion value and outputs and stores the larger one as a second motion value. The adjusted motion value is a value derived by adjusting an adjacent previous second motion value.

In another aspect, the present invention provides a method for detecting motion pictures used in an image displaying system for dynamic image displaying. In this method, a current image frame and a previous image frame that are received by the image displaying system are analyzed and a first motion value associated with the current image frame is calculated. In addition, the current first motion value is compared against an adjusted motion value. A larger one is outputted and stored as a second motion value. The adjusted motion value is a value derived by adjusting an adjacent previous second motion value.

In still another aspect, the present invention provides an image displaying system comprising a motion picture detecting unit to detect a dynamic state of a continuously inputted image frame and obtain a motion reference value through calculation. The motion reference value is used as reference for subsequent dynamic display processing. The motion picture detecting unit is constructed in a manner as described above.

In order to make the aforementioned and other features and advantages of the present invention more comprehensible, embodiments accompanied with figures are described in detail below.

DESCRIPTION OF THE EMBODIMENTS

In the present invention, the accuracy of detecting motion pictures is investigated based on traditional way of dynamic image displaying. The traditional way of dynamic image displaying such as the way illustrated in FIG. 1 can cause an error in calculating motion values, which is explained below in detail.

Figure 3:
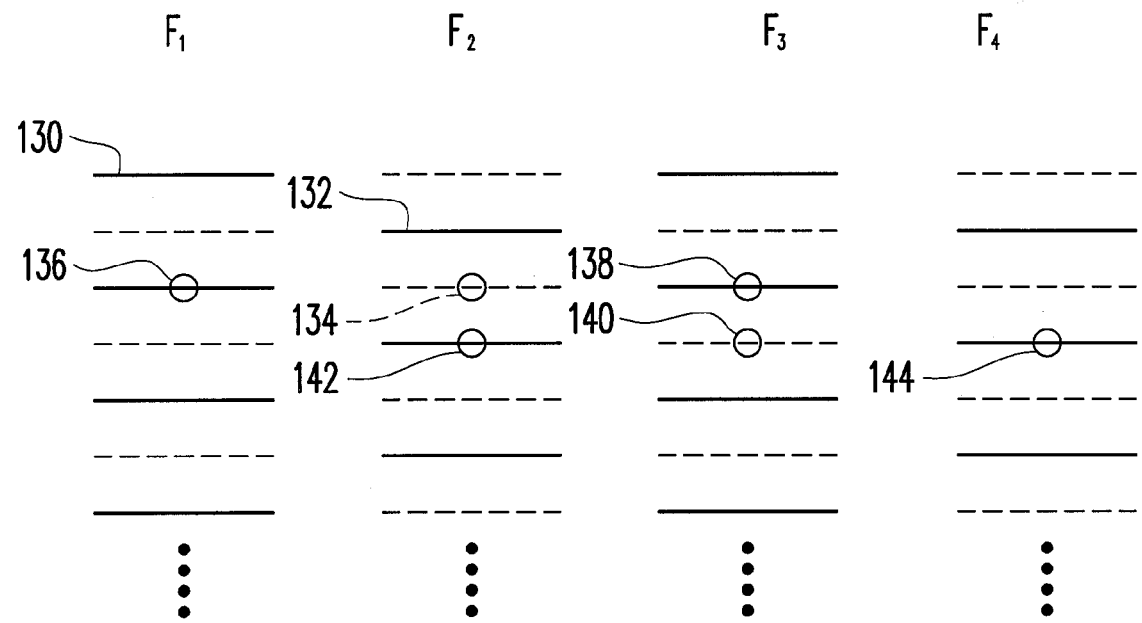
FIG. 3 illustrates a de-interlacing mechanism of dynamic image displaying.

A dynamic image is typically displayed using a mechanism of de-interlacing, 3D comb-filter or 3D noise reduction. The dynamic image may for example be a video. The de-interlacing mechanism of dynamic image displaying is firstly explained with reference to FIG. 3. Referring to FIG. 3, a complete image frame includes a plurality of image scanning lines. The de-interlacing mechanism is such that a complete image frame is separated into an odd-line image frame and an even-line image frame which are stored alternately and outputted in sequence to display the image. For example, an image frame F1 includes a plurality of odd scanning lines 130, 136, etc., as shown by solid lines. However, image data of even scanning lines as shown by broken lines is not stored. Then, for an image frame F2, only image data of the even scanning lines 132, 134, etc., is stored. For an image frame F3, likewise, only image data of the odd scanning lines is stored. For an image frame F4, likewise, only image data of the even scanning lines is stored. That is, the odd-line image frame and the even-line image frame are alternately outputted and displayed. However, since a complete image must include an odd-line image frame and an even-line image frame, the image data of the broken scanning lines needs to be obtained by interpolation using the image data of previous and next solid scanning lines. This is so-called de-interlacing mechanism which has been well known in the art. For example, the image data of the scanning line 134 of the image frame F2 is obtained by interpolation using the scanning line 136 of the image frame F1 and the scanning lines 138 of the image frame F3. Similarly, the image data of the even scanning line 140 of the image frame F3 is obtained by interpolation using the scanning line 142 of the image frame F2 and the scanning line 144 of the image frame F4.

Figure 4:
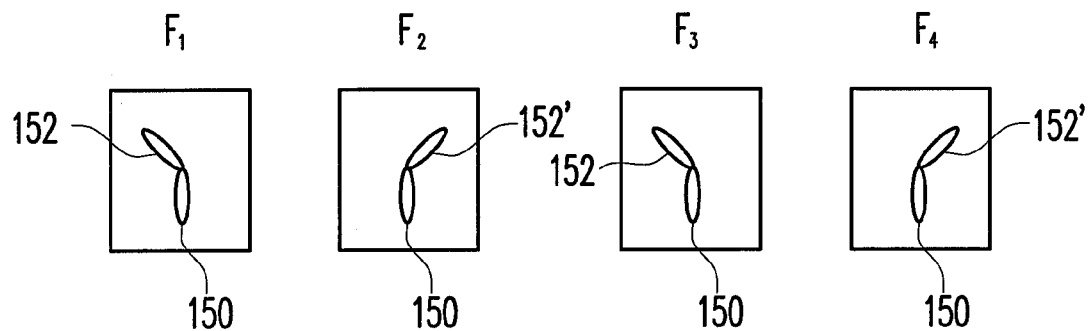
FIG. 4 illustrates a situation where the motion value calculating error may occur.

Since only the odd image frames F1 and F3 have corresponding image data to compare, the time difference between the time points of the image data to be compared is the combined displaying time of two image frames when calculating the motion value. If there are pictures in rapid motion, it may easily generate errors. FIG. 4 illustrates a situation where the motion value calculating error may be generated. Referring to FIG. 4, a dynamic image having two elements 150 and 152 is illustrated as an example. For example, if the element 150 is static while the element 152 is conducting a wagging movement with a movement frequency being approximately the same as the displaying frequency of the image frame, then the images of the image frame F1 and the image frame F2 appear notably different but the images of the image frame F1 and the image frame F3 do not appear notably different. However, the motion value is calculated using the de-interlacing mechanism based on the image frame F1 and the image Frame 3 and, therefore, it would be detected that the element 152 is not moving substantially. In contrast, the element 152 has indeed moved to become the element 152' in the image frame F2 and the image frame F4, which thus results in the error in calculating the motion value.

Figure 5:
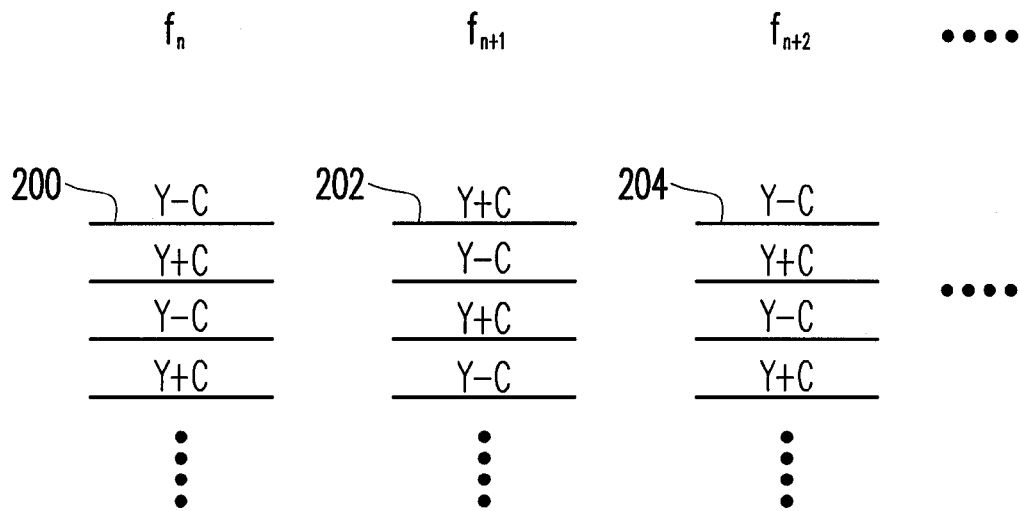
FIG. 5 illustrates a 3D comb-filter mechanism of dynamic image displaying.

For another displaying mechanism such as the 3D comb-filter mechanism, it has the similar problem. FIG. 5 illustrates the 3D comb-filter mechanism of the dynamic image displaying. Referring to FIG. 5, a pixel generally consists of RGB subpixels to form various colors. However, coordinate information of the RGB can also be converted into color coordinates of YCbCr. The 3D comb-filter mechanism adopts the color coordinates of YCbCr and CbCr may be combined or separated. CbCr may be combined into C data such that $C=Cr*\sin(\omega t)+Cb*\cos(\omega t)$. Taking Y/C separation as an example, the image data 200 stored in the image frame $f_n$ includes, for example, Y−C and Y+C stored by interleave. The image data 202 stored in an adjacent next image frame $f_{n+1}$ includes Y+C and Y−C stored in interleave, which correspond to the image data of image frame fn. The data stored in the image frame $f_n$ and the image frame $f_{n+2}$ share the same form and therefore the motion value is calculated based on the image frame fn and the image frame $f_{n+2}$. It can be seen that this may also generate errors in calculating the motion value.

In addition, for the 3D noise reduction mechanism of the image displaying, its image frame data is similar to that shown in FIG. 5, except that the Y and C are obtained in a different manner which can readily be appreciated by those skilled in the art and thus is not described herein in detail.

Figure 1:
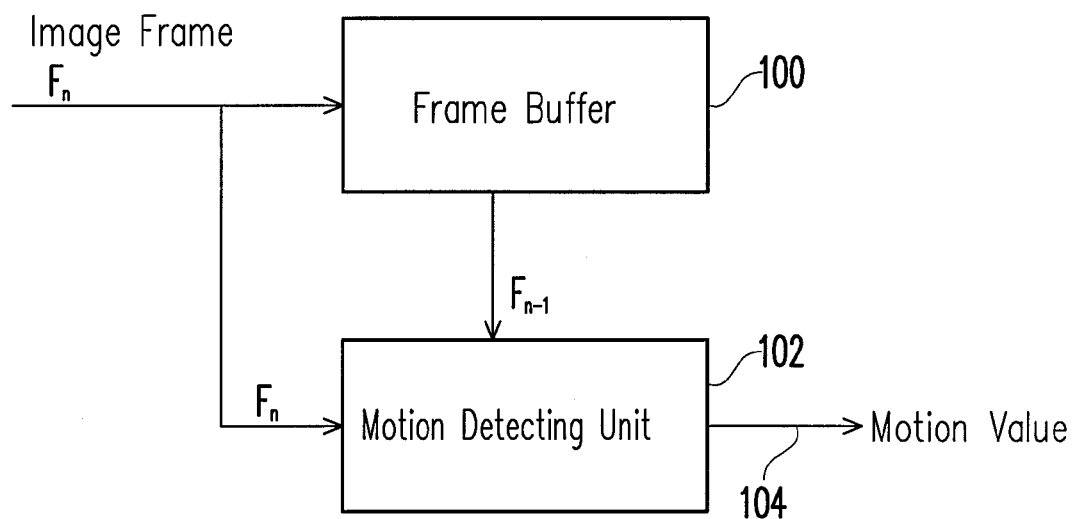
FIG. 1 illustrates a conventional circuit for detecting motion.
Figure 2:
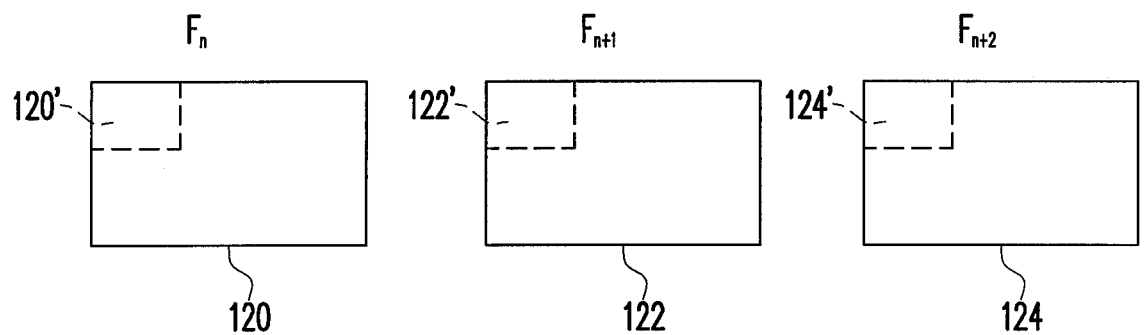
FIG. 2 illustrates an implementation result of the circuit of FIG. 1.

Take a cartoon bee vibrating its wings as an example. The body of the bee is substantially static but the wings are rapidly vibrating. If a traditional motion value calculated according to FIG. 1 is used, the vibration of the wings cannot be correctly displayed. When displaying the wing vibration, lattice fringes often appear in the wing vibration region of the image and, as a result, the rapid wing vibration cannot be truly reproduced.

Having investigated the traditional manners of displaying, the inventors of the present invention found that at least the drawbacks described above exist in the traditional displaying manners and determined that these drawbacks are results of the errors in calculating the motion values. Accordingly, the present invention attempts to develop the technology that can more accurately detect the dynamic image to improve the displaying quality. The present invention is described below in connection with several exemplary embodiments. It should be noted, however, that the present invention is not limited to the particular embodiments described herein.

Figure 6:
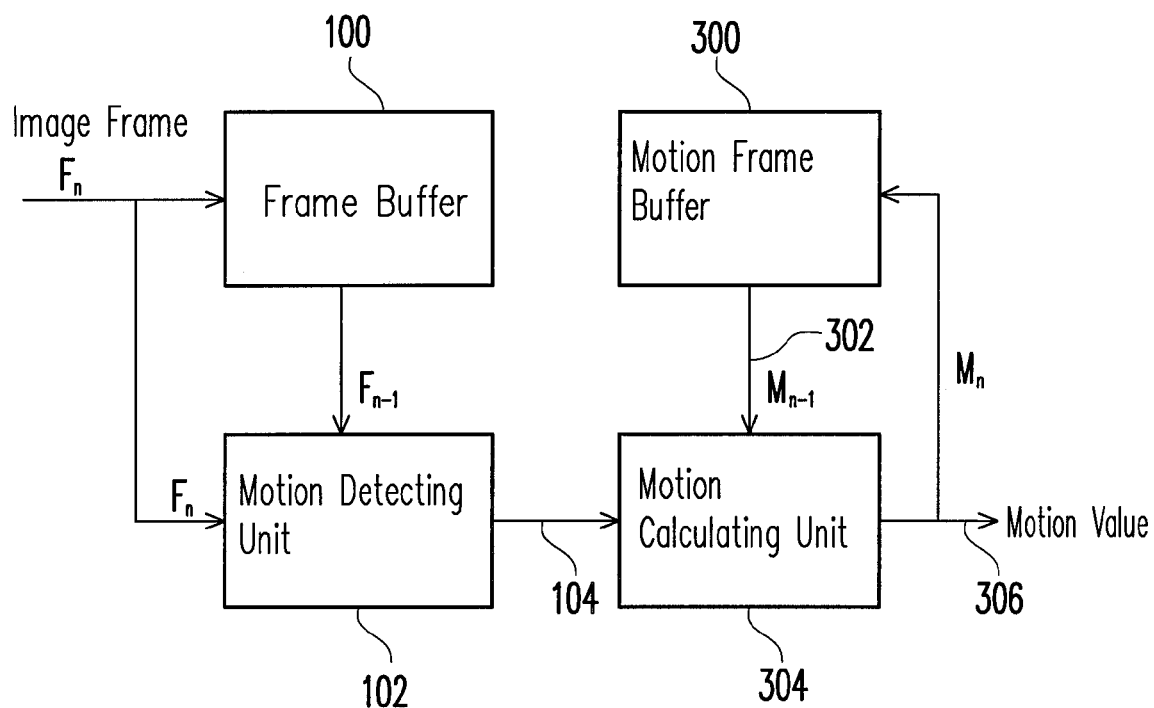
FIG. 6 illustrates a circuit for detecting motion pictures according to one embodiment of the present invention.

FIG. 6 illustrates a circuit for detecting motion pictures according to one embodiment of the present invention. Referring to FIG. 6, the motion picture detecting circuit is, for example, incorporated in an image displaying system for receiving data of continuously inputted image frames Fn. The motion picture detecting circuit includes a first-stage motion picture detecting unit and a second-stage motion picture detecting unit. The first-stage motion picture detecting unit includes a frame buffer 100 and a motion detecting unit 102 for analyzing a current image frame $F_n$ and a previous image frame $F_{n-1}$ to obtain a first motion value associated with the current image frame. It should be understood that the first-stage motion picture detecting unit may calculate the motion value in a traditional manner and the image frame $F_{n-1}$ represents a previous image frame with data stored in the same manner, e.g., both the image frames $F_n$ and $F_{n-1}$ are even-line image frames or odd-line image frames, depending upon the manner of calculating that is actually adopted. The motion value is, for example, an absolute value of a result of subtraction or calculated in another suitable manner to indicate a state of the picture motion. The motion value typically ranges between two end values, one of which indicates a static state of an object and the other indicates an extremely dynamic state of the object. An intermediate value between the two end values indicates an intermediate degree of motion of the object. The motion value is outputted through a path 104 from the motion detecting unit 102.

The second-stage motion picture detecting unit includes, for example, a motion image frame buffer 300 and a motion calculating unit 304. The motion calculating unit 304 continuously receives the motion values from the path 104. In addition, the motion image frame buffer 300 also buffers a current motion value Mn to be used as an adjacent previous motion value Mn−1 when calculating a next motion value Mn. As to the circuit, the motion image frame buffer 300 is a feedback path of the motion calculating unit 304, which buffers the currently outputted adjusted motion value Mn and feeds back the motion value Mn to the motion value calculating unit 304 for a next adjustment calculation. That is, the motion value calculating unit 304 calculates an adjusted motion value Mn based on the fed back motion value Mn according to an algorithm. The motion image frame buffer 300, for example, only performs the buffer and feedback operations. However, in accordance with the mechanism described subsequently in the present embodiment for the motion image frame buffer 300 and the motion calculating unit 304, the two units can be integrated as the second stage motion picture detection unit without the separate implementation of the motion image frame buffer 300 and the motion calculating unit 304.

Figure 7:
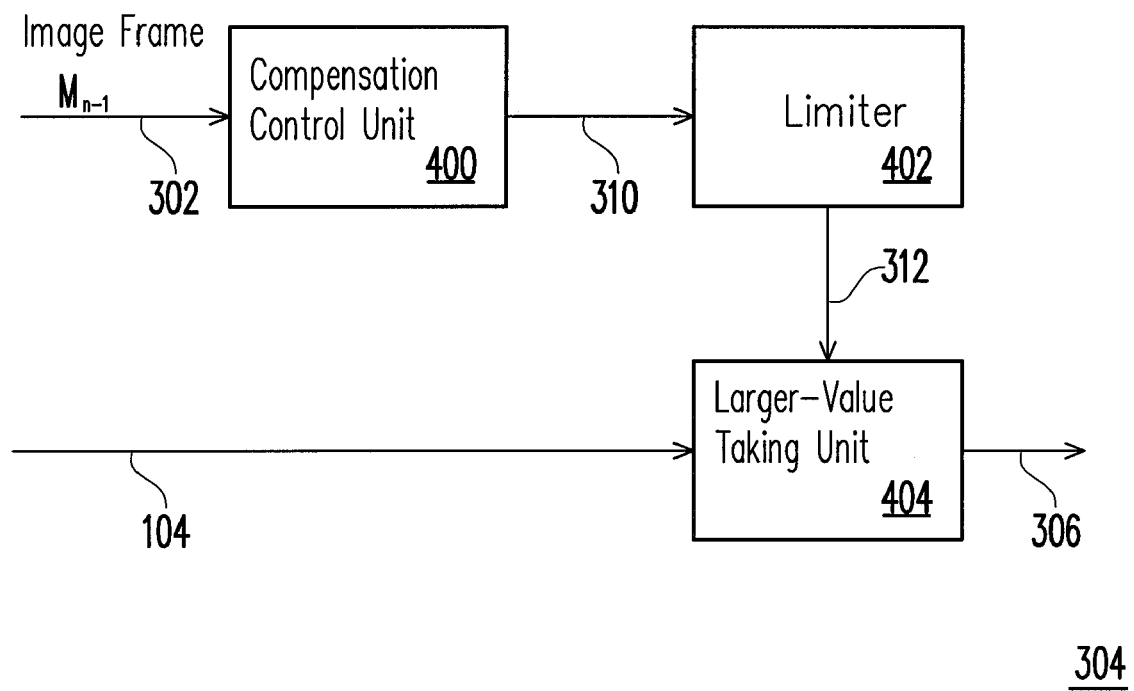
FIG. 7 illustrates a circuit of the motion calculating unit according to one embodiment of the present invention.

Now the adjustment mechanism of the motion calculating unit 304 is described. FIG. 7 illustrates a circuit of the motion calculating unit 304 according to one embodiment of the present invention. Referring to FIG. 7, the motion calculating unit 304 includes a compensation control unit 400 for receiving the motion value $M_{n-1}$ fed back through the path 302. The compensation control unit 400 performs a calculation such as:

$$Mn'=Mn-1*a-b,$$

where, a is a reduction rate ranging between 0-1, preferably between 0.65 and 0.95, which is determined by, for example, experience of statistics, and b is a compensation value. The adjusted motion value Mn' calculated by the compensation control unit 400 is outputted through a path 310 to a limiter 402 to determine whether the adjusted motion value $M_n'$ is within a predetermined range. If the adjusted motion value $M_n'$ goes beyond the predetermined range, then the adjusted motion value $M_n'$ is set as the end value. The adjusted motion value $M_n'$ that has been limited by the limiter 402 is then outputted through a path 312. Next, a larger-value taking unit 404 compares the first-stage motion value inputted through the path 104 and the adjusted motion value $M_n'$ inputted through the path 312 and takes the larger one as the motion value $M_n$ of the current image frame. This motion value $M_n$ is also fed back through and stored in the motion image frame buffer 300 for a next calculation. The foregoing-described operations are repeatedly performed in the same manner.

In addition, the present invention also provides a method for detecting motion pictures which is used in an image displaying system for displaying dynamic images. In this method, a current image frame and a previous image frame received by the image displaying system are analyzed to calculate a first motion value associated with each current image frame. Subsequently, the current first motion value is compared against an adjusted motion value and a larger one is outputted and stored as a second motion value. The adjusted motion value is a value derived by adjusting an adjacent previous second motion value.

Since the motion value of the present embodiment is adjusted through the mechanism shown in FIG. 7, the motion picture can thus be accurately detected. For the above-mentioned local rapid vibration of the bee wing, the entire wing shape and vibration can be perfectly displayed without generating the lattice fringes.

In the present invention, the adjustment of the motion value still allows the adjacent previous image frame to be used to provide a degree of dynamic change, thus achieving more accurate estimation and hence reducing errors in detecting the dynamic image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A circuit for detecting motion pictures, comprising:
   a first-stage motion picture detecting unit adapted to analyze a current image frame and a previous image frame to calculate a first motion value associated with the current image frame; and
   a second-stage motion picture detecting unit adapted to receive the first motion value, compare the current first motion value against an adjusted motion value and output and store the larger one as a second motion value, wherein the adjusted motion value is a value derived by adjusting an adjacent previous second motion value,
   wherein the adjusted motion value is reduced according to a calculation algorithm on the adjacent previous second motion value, and the algorithm is such that the adjacent previous second motion value is multiplied by a reduction rate and subtracted by a compensation value.

2. The circuit for detecting motion pictures according to claim 1, wherein the second-stage motion picture detecting unit comprises a buffer unit and a motion value calculating unit,
   wherein the buffer unit is a feedback path of the motion value calculating unit, which stores the currently outputted second motion value and feeds back the second motion value to the motion value calculating unit,
   wherein the motion value calculating unit has a calculation on the second motion value being fed back by reducing the previous second motion value according to the algorithm and obtains the adjusted motion value.

3. The circuit for detecting motion pictures according to claim 2, wherein the motion value calculating unit comprises:
   a compensation control unit adapted to receive the second motion value from the buffer unit and adjust the motion value according to the algorithm; and
   a limiter adapted to output the adjusted motion value after limiting the adjusted motion value to be within a predetermined range.

4. The circuit for detecting motion pictures according to claim 1, wherein the reduction rate ranges from 0.65 to 0.95.

5. The circuit for detecting motion pictures according to claim 1, wherein the image frame is displayed using a de-interlacing mechanism, a 3D comb-filter mechanism or a 3D noise reduction mechanism.

6. The circuit for detecting motion pictures according to claim 1, wherein the first-stage motion picture detecting unit comprises:
   an image frame buffer adapted to receive a plurality of continuously inputted image frames and buffer at least the current image frame and the adjacent previous image frame; and
   a motion detecting unit adapted to receive the current image frame and the adjacent previous image frame and calculate a first motion value associated with the current image frame.

7. A method for detecting motion pictures used in an image displaying system for dynamic image displaying, the method comprising:
   analyzing a current image frame and a previous image frame that are received by the image displaying system to calculate a first motion value associated with the current image frame; and
   comparing the current first motion value against an adjusted motion value and outputting and storing the larger one as a second motion value,
   wherein the adjusted motion value is a value derived by adjusting an adjacent previous second motion value, wherein the adjusted motion value is derived by reducing the adjacent previous second motion value according to an algorithm, and the algorithm is such that the adjacent previous second motion value is multiplied by a reduction rate and subtracted by a compensation value.

8. The method for detecting motion pictures according to claim 7, wherein the reduction rate ranges from 0.65 to 0.95.

9. The method for detecting motion pictures according to claim 7, wherein the image frame is displayed using a de-interlacing mechanism, a 3D comb-filter mechanism or a 3D noise reduction mechanism.

10. The method for detecting motion pictures according to claim 7, wherein the step of analyzing the current image frame and the previous image frame that are received by the image displaying system comprises:
  buffering the current image frame and the adjacent previous image frame using a buffer; and
  performing calculation on the current image frame and the adjacent previous image frame to obtain a first motion value associated with the current image frame.

11. An image displaying system comprising:
  a motion picture detecting unit adapted to detect a dynamic state of a continuously inputted image frame and obtain a motion reference value through calculation, the motion reference value being used as reference for subsequent dynamic display processing, the motion picture detecting unit comprising:
    a first-stage motion picture detecting unit adapted to analyze a current image frame and a previous image frame to calculate a first motion value associated with the current image frame; and
    a second-stage motion picture detecting unit adapted to receive the first motion value, compare the current first motion value against an adjusted motion value and output and store the larger one as a second motion value, wherein the adjusted motion value is a value derived by adjusting an adjacent previous second motion value,
  wherein the adjusted motion value is derived by reducing the adjacent previous second motion value according to an algorithm and the algorithm is such that the adjacent previous second motion value is multiplied by a reduction rate and subtracted by a compensation value.

12. The image displaying system according to claim 11, wherein the second-stage motion picture detecting unit comprises a buffer unit and a motion value calculating unit, wherein the buffer unit is a feedback path of the motion value calculating unit, which stores the currently outputted second motion value and feeds back the second motion value to the motion value calculating unit, and, upon receiving the second motion value fed back, the motion value calculating unit obtains the adjusted motion value by reducing the previous second motion value according to the algorithm.

13. The image displaying system according to claim 12, wherein the motion value calculating unit comprises:
  a compensation control unit adapted to receive the second motion value from the buffer unit and adjust the motion value according to the algorithm; and
  a limiter adapted to output the adjusted motion value after limiting the adjusted motion value to be within a predetermined range.

* * * * *